(12) United States Patent
Salmia et al.

(10) Patent No.: US 10,495,145 B2
(45) Date of Patent: Dec. 3, 2019

(54) ACTIVE MAGNETIC BEARING CONTROLLER

(71) Applicant: Ingersoll-Rand Company, Davidson, NC (US)

(72) Inventors: Lauri Juhani Salmia, Vantaa (FI); Juha Tuomas Saari, Espoo (FI); Petri Juhani Maki-Ontto, Espoo (FI); Risto Komulainen, Klaukkala (FI)

(73) Assignee: Ingersoll-Rand Company, Davidson, NC (US)

( * ) Notice: Subject to any disclaimer, the term of this patent is extended or adjusted under 35 U.S.C. 154(b) by 566 days.

(21) Appl. No.: 15/136,153

(22) Filed: Apr. 22, 2016

(65) Prior Publication Data

US 2017/0307013 A1 Oct. 26, 2017

(51) Int. Cl.
*H02K 7/09* (2006.01)
*F16C 32/04* (2006.01)

(52) U.S. Cl.
CPC ...... *F16C 32/0457* (2013.01); *F16C 32/0448* (2013.01)

(58) Field of Classification Search
CPC .................. F16C 32/0457; F16C 32/0448
USPC ....................................... 310/90.5
See application file for complete search history.

(56) References Cited

U.S. PATENT DOCUMENTS

| | | | | |
|---|---|---|---|---|
| 5,627,421 A | * | 5/1997 | Miller | F16C 32/0457 310/51 |
| 6,005,316 A | * | 12/1999 | Harris | F16C 32/0457 310/90.5 |
| 7,440,300 B2 | | 10/2008 | Konishi et al. | |
| 7,813,153 B2 | | 10/2010 | Zacharias et al. | |
| 8,116,103 B2 | | 2/2012 | Zacharias et al. | |
| 8,493,761 B2 | | 7/2013 | Tan et al. | |
| 2001/0013733 A1 | | 8/2001 | Schob | |
| 2006/0125436 A1 | | 6/2006 | Lin | |

(Continued)

FOREIGN PATENT DOCUMENTS

| | | |
|---|---|---|
| JP | H0783221 | 9/1995 |
| JP | 2016042768 A | 3/2016 |

OTHER PUBLICATIONS

Extended European Search Report, European Patent Application No. 171677651.1, dated Sep. 15, 2017, 9 pages.

*Primary Examiner* — Jianchun Qin
(74) *Attorney, Agent, or Firm* — Taft Stettinius & Hollister LLP

(57) ABSTRACT

Unique systems, methods, techniques and apparatuses of active magnetic bearing control systems are disclosed. One exemplary embodiment is a power converter electrically coupled to an active magnetic bearing (AMB) having a plurality of windings, the power converter comprising a DC bus, two capacitors, a first leg, a second leg, and a controller. The capacitors are electrically coupled in series between the positive rail and negative rail, one capacitor being electrically coupled to the other capacitor at a midpoint connection. The first leg comprises a first semiconductor switching device and a first output node. The second leg comprises a second semiconductor switching device and a second output node. The first output node is electrically coupled to the midpoint connection by way of a first AMB winding and the second output node is electrically coupled to the midpoint connection by way of a second AMB winding.

4 Claims, 3 Drawing Sheets

(56) References Cited

U.S. PATENT DOCUMENTS

| | | |
|---|---|---|
| 2007/0081364 A1 | 4/2007 | Andreycak |
| 2007/0278987 A1 | 12/2007 | Bartholet et al. |
| 2009/0196764 A1* | 8/2009 | Fogarty ............... F04D 25/0606 417/44.1 |
| 2013/0200715 A1 | 8/2013 | Pettersson et al. |
| 2015/0280593 A1 | 10/2015 | Ando et al. |

* cited by examiner

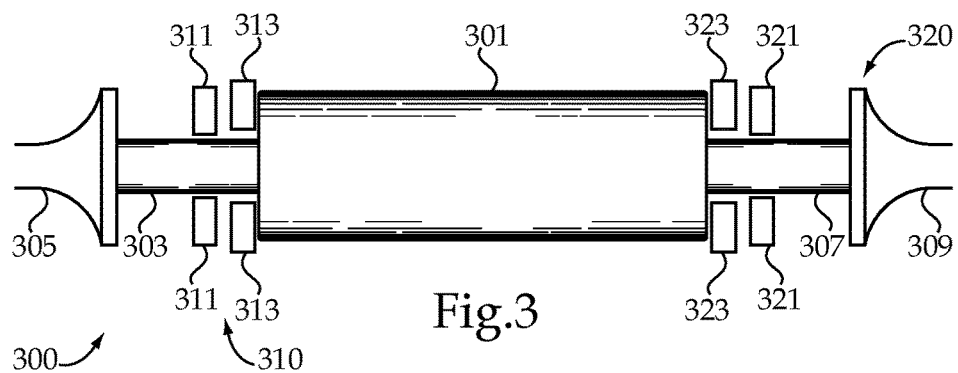
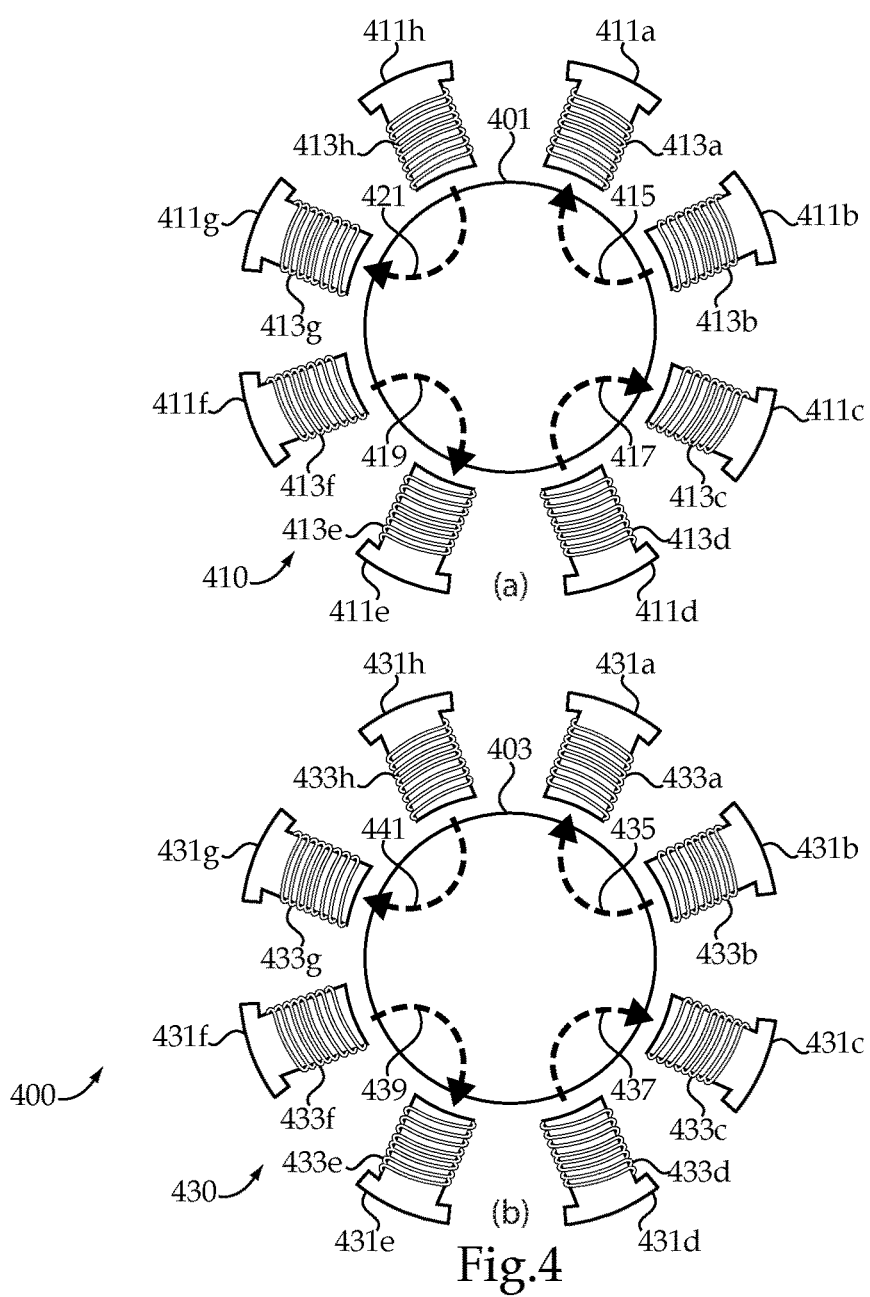

ACTIVE MAGNETIC BEARING CONTROLLER

FIELD OF TECHNOLOGY

The present disclosure relates generally to an active magnetic bearing (AMB). More precisely, the invention is related to the power amplifiers of an AMB controller with an improved configuration that reduces the number of power semiconductor components and isolated current sensors.

BACKGROUND

Three-phase induction motors have been widely recognized as workhorses of many industrial applications. Electric motors exist for different speed ranges. A high speed operation range presents certain advantages over the speed ranges possible by the direct 50/60 Hz mains frequency. Increasing the rated speed is an effective way to boost power density and efficiency. Interesting operation fields of high speed motors are applications where a gear-box and a standard motor can be replaced by a directly driven high speed motor.

The rotor of an electrical machine is usually supported by a plurality of bearings. In some instances, such as high speed rotor operation, it is beneficial to use an AMB instead of a traditional mechanical bearing. AMBs support the rotor shaft by generating a controlled magnetic flux which exerts a force on the rotor to maintain a desired rotor shaft position. The AMB is controlled by a magnetic bearing controller. Existing magnetic bearing controllers suffer from a number of shortcomings and disadvantages. There remain unmet needs including reducing hardware complexity, reducing switching losses, and increasing reliability. For instance, some magnetic bearing controllers require a large number of switches in order to step down an input voltage and provide power to a pair of windings of the magnetic bearing. In another example, some magnetic bearing controllers require isolated current sensors to calculate the appropriate amount of magnetic flux to provide to a magnetic bearing winding. There is a significant need for the unique apparatuses, methods, systems and techniques disclosed herein.

SUMMARY

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

Exemplary embodiments include unique systems, methods, techniques and apparatuses for an active magnetic bearing controller. Further embodiments, forms, objects, features, advantages, aspects and benefits of the disclosure shall become apparent from the following description and drawings.

According to the application, a symmetrical, two-level intermediate DC-circuit voltage with substantially equal voltage levels is used as the power supply for the AMB power amplifiers, also known as magnet drivers, and the winding current loads between the voltage halves are shared as evenly as possible. In the arrangement one end of each winding is connected to the DC-circuit middle point, which makes it possible and advantageous to sense the currents by low cost shunt resistors which are placed to this potential.

According to an embodiment of the application, the power amplifiers are arranged in pairs so that each pair comprises an upside and a downside power amplifier, with as even as possible winding current loads.

According to the control method of the application, the upside and downside power amplifiers of each pair are controlled such that the sharp edges of the output voltage pulses are as simultaneous as possible and opposite directed, minimizing the capacitive current sum through the stray capacitances into the environment and thus minimizing the high frequency emission from the system. The equally loaded power amplifier pair arrangement and control method for opposite directed voltage pulses minimizes also the current ripple of the DC-link smoothing capacitors, thus increasing their lifetime.

According to an embodiment of the application, an extra power amplifier may be used for keep the voltages of the DC-circuit halves in balance.

BRIEF DESCRIPTION OF THE DRAWINGS

FIG. 3 illustrates an exemplary AMB arrangement.

FIG. 4 illustrates two cross sections of a rotor shaft surrounded by an exemplary AMB arrangement.

DETAILED DESCRIPTION OF ILLUSTRATIVE EMBODIMENTS

Figure 1:
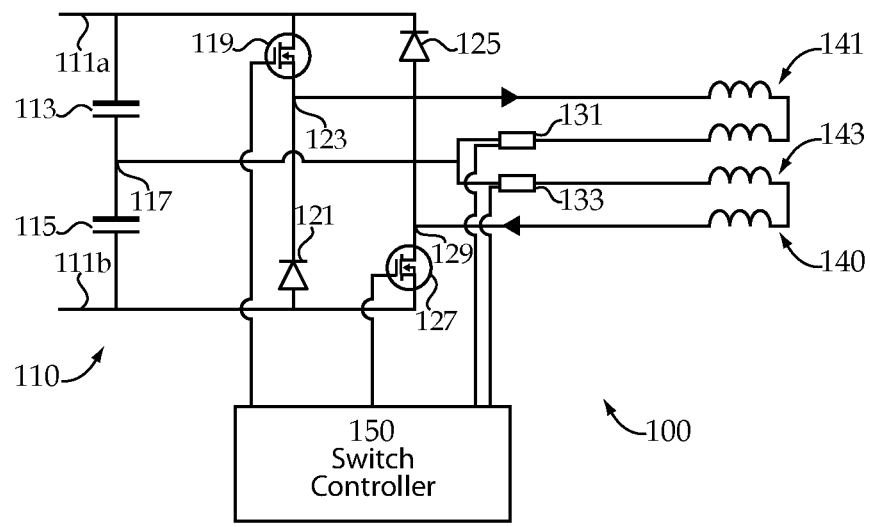
FIG. 1 illustrates an exemplary active magnetic bearing (AMB) controller.

With reference to FIG. 1 there is illustrated an active magnetic bearing (AMB) system 100. It shall be appreciated that system 100 may be implemented in a variety of applications, including air compressors, flywheels, turbines, and pumping systems, to name but a few examples.

System 100 includes a power converter 110 and a plurality of magnetic bearing winding pairs 140. Converter 110 includes a positive DC bus rail 111a structured to receive power from the positive pole of a DC power source (not pictured) and a negative DC bus rail 111b structured to receive power from the negative pole of the DC power source. The voltage difference between rail 111a and 111b is $V_{dc}$. A capacitor 113 is electrically coupled to the positive DC bus rail 111a and a midpoint connection 117. A capacitor 115 is electrically coupled to the midpoint connection 117 and the negative DC bus rail 111b. Capacitors 113 and 115 are of substantially equal size such that the voltage across each of capacitors 113 and 115 is one-half $V_{dc}$ and the voltage at midpoint connection 117 is 0 V.

Converter 110 also includes a first leg having a semiconductor switching device 119 electrically coupled between positive DC bus rail 111a and output node 123, and a diode 121 electrically coupled between output node 123 and DC bus rail 111b. In certain embodiments, semiconductor switching device 119 is an insulated gate bipolar transistor, a metal-oxide-semiconductor field-effect transistor. It shall be appreciated that any or all of the foregoing features of semiconductor switching device 119 may also be present in the other semiconductor switching devices disclosed herein.

Converter 110 further includes a second leg having a diode 125 electrically coupled between the positive DC bus rail 111a and an output node 129 and a semiconductor switching device 127 electrically coupled between output node 129 and the negative DC bus rail 111b.

Converter 110 further includes a pair of sensors 131 and 133 structured to observe current. In one embodiment, the sensors 131 and 133 are shunt resistors structured to take a series of current measurements and transmit the current measurements.

The plurality of magnetic bearing winding pairs 140 include a first winding pair 141 and a second winding pair 143. Winding pair 141 includes two AMB windings electrically coupled in series between the output node 123 and sensor 131. Winding pair 143 includes two AMB windings electrically coupled between sensor 133 and output node 129. Output node 123 is therefore electrically coupled to midpoint connection 117 by way of winding pair 141 and output node 129 is electrically coupled to midpoint connection 117 by way of winding pair 143. In certain embodiments, a single magnetic bearing winding may be used in place of winding pair 141 or 143.

Converter 110 further includes a switch controller 150 electrically coupled to switching devices 119 and 127 and sensors 131 and 133. Controller 150 is structured to control switching devices 119 and 127 so as to provide substantially cophasal power to winding pairs 141 and 143 by transmitting a plurality of activation signals to the switching devices 119 and 127 to open and close devices 119 and 127. Controller 150 is structured to receive current measurements from sensors 131 and 133.

While the embodiments described hereinafter may not specifically describe features analogous to the features of system 100, such features may nonetheless be employed in connection with the described systems.

Figure 2:
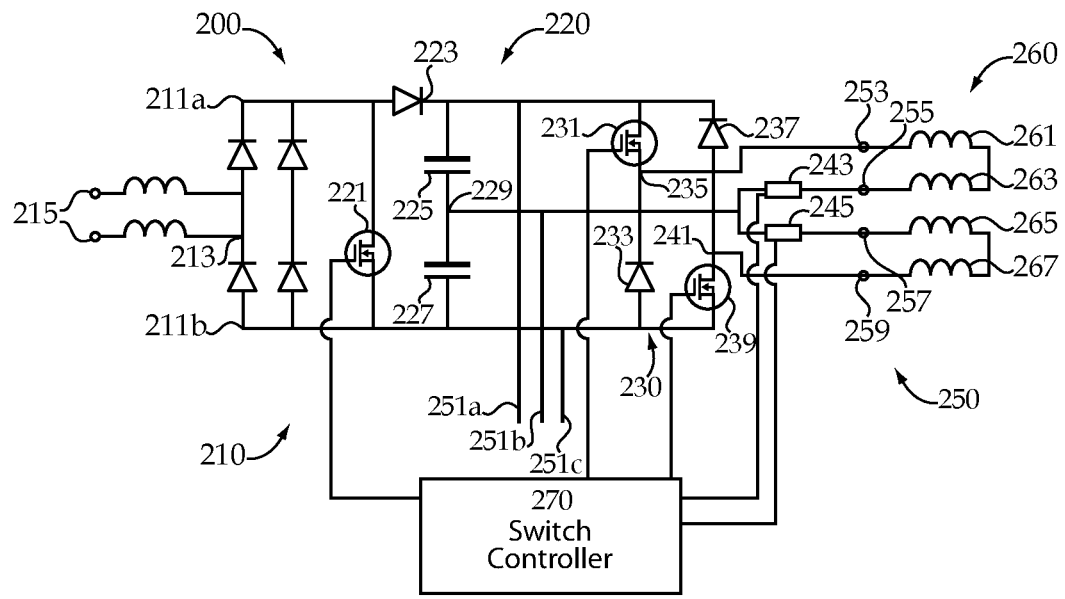
FIG. 2 illustrates another exemplary AMB controller.

With reference to FIG. 2 there is illustrated an exemplary AMB system 200. System 200 includes a DC power supply 210. In the illustrated embodiment, DC power supply 210 includes a rectifier 213 electrically coupled to a DC bus having a positive rail 211a and a negative rail 211b. DC power source 210 also includes AC lines 215 electrically coupled to an AC power supply (not pictured). The rectifier 213 is structured to receive power from the AC power source by way of the AC lines 215, convert the AC power to DC power with a voltage $V_{dc}$, and provide DC power to the positive rail 211a and the negative rail 211b of the DC bus. In other embodiments, The DC power supply 210 is a battery bank, a fuel cell, a photovoltaic array, or a DC distribution grid.

System 200 further includes a power factor correction (PFC) circuit 220 electrically coupled to the positive rail 211a and the negative rail 211b. The PFC circuit 220 is structured to receive power from the positive rail 211a and negative rail 211b, and to adjust the ratio of real power to reactive power in system 200. PFC circuit 220 includes a semiconductor switching device 221 electrically coupled between the positive rail 211a and negative rail 211b. PFC circuit 220 also includes a capacitor 225 electrically coupled to the positive rail 211a and a capacitor 227 electrically coupled to negative rail 211b, capacitors 225 and 227 being electrically coupled together at a midpoint connection 229. On the positive rail 211a between the points on the positive rail electrically coupled to semiconductor switching device 221 and capacitor 225, a diode is electrically coupled to the positive rail, the diode 223 being structured to block current moving towards the DC power supply 210 on the positive rail 211a.

System 200 further includes a magnetic driver circuit 230 electrically coupled to positive rail 211a and negative rail 211b and structured to receive DC power from DC power supply 210 by way of positive rail 211a and negative rail 211b. Circuit 230 includes a first leg having a semiconductor switching device 231 electrically coupled to the positive rail 211a. The first leg also includes a diode 233 electrically coupled to negative rail 211b and also electrically coupled to the semiconductor switching device 231 by way of an output node 235. Circuit 230 also includes a second leg having a diode 237 electrically coupled to positive rail 211a and a semiconductor switching device 239 electrically coupled to the negative rail 211b. Diode 237 is electrically coupled to semiconductor switching device 239 by way of an output node 241.

Magnetic driver circuit 230 also includes two sensors 243 and 245, each of which are structured to measure current. Both sensors 243 and 245 are electrically coupled to midpoint connection 229.

System 200 includes a plurality of outputs 250 structured to provide power to magnetic bearing windings, the power having a voltage difference between 0 V and one-half $V_{dc}$. The plurality of outputs 250 include DC bus output lines 251a-251c and magnetic bearing connection lines 253, 255, 257, and 259. DC bus output line 251a is electrically coupled between positive rail and a plurality of additional magnetic driver circuits (no pictured) with features analogous to magnetic driver circuit 230. DC bus output line 251b is electrically coupled between midpoint connection 229 and the plurality of additional magnetic driver circuit. DC bus output line 251c is electrically coupled between negative rail 211b and the plurality of additional magnetic driver circuits. For example, DC bus output lines 251a-251c are coupled to four additional magnetic driver circuits, each magnetic driver circuit having two legs each with an output node electrically coupled to midpoint connection 229 by way of a unique magnetic bearing winding.

The plurality of outputs 250 also includes magnetic bearing connection lines 253, 255, 257, and 259 which are structured to provide power from the magnetic driver circuit 230 to a plurality of bearing windings 260, including bearing windings 261, 263, 265, and 267. Specifically, line 253 is electrically coupled between output node 235 and bearing winding 261. Line 255 is electrically coupled between sensor 243 and winding 263. Line 257 is electrically coupled between sensor 245 and winding 265. Line 259 is electrically coupled between output node 241 and winding 267.

As discussed in more detail below, the illustrated bearing windings are structured to operate in pairs. For example, windings 261 and 263 are electrically coupled together and form one winding pair and windings 265 and 267 are electrically coupled together and form a second winding pair. In other embodiments, the winding pairs are replaced by a single winding.

System 200 further includes a switch controller 270 electrically coupled to semiconductor switching devices 221, 231, and 239. Controller 270 is structured to control semiconductor switching devices 231 and 239 so as to provide substantially cophasal power to winding pair 261 and 263, and winding pair 265 and 267. Switch controller 270 is also structured to perform power factor correction operations by operating switching device 221. Controller 270 operates switching devices 221, 231, and 239 by transmitting an activation signal to the respective device in order to open and close the device.

While the embodiments described hereinafter may not specifically describe features analogous to the features of system 200, such features may nonetheless be employed in connection with the described systems.

With reference to FIG. 3 there is illustrated a rotor arrangement 300 having an exemplary magnetic bearing arrangement 310 structured to levitate and support a rotor 301. Arrangement 300 includes the rotor 301 mechanically coupled to a first stage 305 by way of a left-side shaft 303. Rotor 301 is mechanically coupled to a second stage 309 by way of a right-side shaft 307. Magnetic bearing arrangement 310 is structured to reduce axial movement of the rotor by selectively exerting a magnetic force on the rotor 301 and structured to reduce the radial movement of the rotor by selectively exerting a magnetic force on the left-side shaft 303 and right-side shaft 307. Specifically, arrangement 310 includes left-side radial magnetic bearings 311, axial magnetic bearings 313 and 323, and right-side radial magnetic bearings 321.

With reference to FIGS. 4(a) and (b) there is illustrated a pair of exemplary radial magnetic bearing arrangements 400, such as the left-side radial magnetic bearings 311 and the right-side magnetic radial bearings 321 of FIG. 3. FIG. 4(a) illustrates a first radial magnetic bearing 410 surrounding a rotor shaft 401 which includes a plurality of windings 411a-411h wound around a plurality of stator teeth 413a-413h, respectively. The windings 411a-h are electrically coupled in four pairs. Specifically, winding 411a is electrically coupled to winding 411b; winding 411c is electrically coupled to winding 411d; winding 411e is electrically coupled to winding 411f; and winding 411g is electrically coupled to winding 411h. When electrically coupled to a power source, each winding pair is structured to generate a magnetic flux which exerts a force on rotor shaft 401, the force being proportional to the current provided to the winding pair. Windings 411a and 411b are structured to generate a magnetic flux 415; windings 411c and 411d are structured to generate a magnetic flux 417; windings 411e and 411f are structured to generate a magnetic flux 419; and windings 411g and 411h are structured to generate a magnetic flux 421. It is important to note magnetic flux 415 is an opposing force to magnetic flux 419 and magnetic flux 417 is an opposing force to magnetic flux 421. The position of shaft 401 relative to the windings 411a-411h is determined by the sum of magnetic fluxes 415, 417, 419, and 421.

FIG. 4(b) illustrates a second radial magnetic bearing 430 surrounding a rotor shaft 403 which includes a plurality of windings 431a-431h wound around a plurality of stator teeth 433a-433h, respectively. The windings 431a-h are electrically coupled in four pairs. Specifically, winding 431a is electrically coupled to winding 431b; winding 431c is electrically coupled to winding 431d; winding 431e is electrically coupled to winding 431f; and winding 431g is electrically coupled to winding 431h. When electrically coupled to a power source, each pair is structured to generate a magnetic flux which exerts a force on rotor shaft 403. Windings 431a and 431b are structured to generate a magnetic flux 435; windings 431c and 431d are structured to generate a magnetic flux 437; windings 431e and 431f are structured to generate a magnetic flux 439; and windings 431g and 431h are structured to generate a magnetic flux 441. It is important to note magnetic flux 435 is an opposing force to magnetic flux 439 and magnetic flux 437 is an opposing force to magnetic flux 441. The position of shaft 403 relative to the stator windings 431a-431h is determined by the sum of magnetic fluxes 435, 437, 439, and 441.

Figure 5:
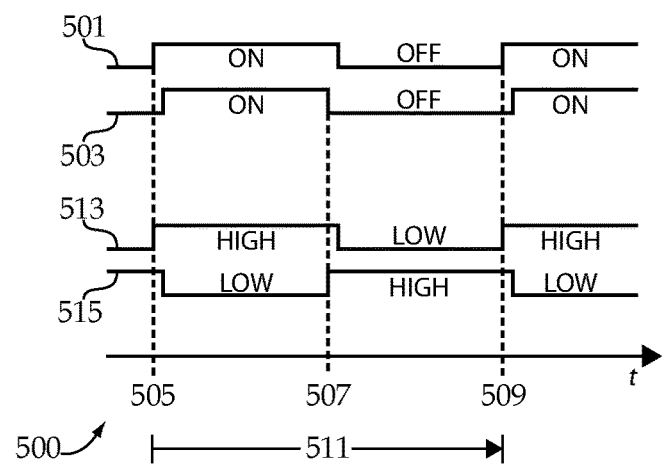
FIG. 5 is a graph illustrating exemplary activation signals.

With reference to FIG. 5 there is a graph 500 illustrating exemplary activation signals generated by a switch controller such as switch controllers 150 and 270 in FIGS. 1 and 2. Graph 500 illustrates two activation signals, signals 501 and 503, each having an active high component and an inactive low component. Graph 500 also illustrates two series of voltage measurements 513 and 515, each series of voltage measurements having a high voltage and a low voltage. The signals and voltages are displayed with respect to time t, including time instant 505, 507, and 509, where the time interval between time instant 505 and 509 is time interval 511. Time interval 511 represents one cycle of activation signal 501. In certain embodiments, the length of the active high component of the activation signals 501 and 503 relative to the inactive low component of the activation signals of 501 and 503 may be shortened or lengthened. As illustrated by graph 500 at time instants 505, 507, and 509, activation signals 501 and 503 are substantially cophasal. As illustrated by graph 500, voltages 513 correspond to the voltage at point 123 and voltages 515 correspond to the voltage at point 129.

With continuing reference to FIGS. 1 and 5, when switch controller 150 transmits signal 501 to switching device 119 and transmits signal 503 to switching device 127, substantially cophasal power is provided to winding pairs 141 and 143. The power provided to winding pairs 141 and 143 are substantially cophasal so as to reduce high frequency current ripple through capacitors 113 and 115, as well as to reduce the high frequency current through stray capacitances, minimizing high frequency emission from system 100. The switch controller 150 is structured to calculate the length of the active high component and the cycle period for each activation signal, such as the time interval 511 for activation signal 501, using measurements received from sensors 131 and 133. For example, if sensor 131 indicates a low current value in winding pair 141, the current level can be raised by increasing the relative length of the active high component of activation signal 501.

At time instant 505, switch controller 150 is structured to transmit an active high signal 501 to switching device 119, causing device 119 to close and connect capacitor 113 voltage across winding pair 141, thus producing a current with an increasing slope through the winding pair 141. In a corresponding manner, at time instant 507, switch controller 150 is structured to transmit an inactive low signal 501 to switching device 119, causing device 119 to open. The current flowing through inductive winding pair 141 by way of device 119 is interrupted and current begins to flow through winding pair 141 by way of diode 121. Capacitor 115 voltage connects across winding pair 141, producing now a current with a decreasing slope flowing through winding pair 141. The timing of signal 503, transmitted by switch controller 150 for controlling switching device 127, is substantially cophasal with the timing of signal 501, differing from it only to the extent which is required by the control of the current flowing through winding pair 143.

Controller 150 is structured to transmit substantially simultaneous active high signals to switching devices 119 and 127 such that the potential steps, as indicated by measurements 513 and 515, of output nodes 123 and 129 take place substantially simultaneously but in opposite directions, which causes the capacitive currents through the stray capacitances in the windings of magnetic bearings and in their connection lines (253 and 259 in FIG. 2) to cancel each other, thus reducing the high frequency noise emitted from the AMB system to the environment.

With continuing reference to FIGS. 1 and 4, the winding pairs coupled to converter 110 may be chosen such that the flux produced by each winding pair is an opposing force to the second winding pair. For example, when a rotor is arranged vertically, winding pair 141 may be windings 411a and 411b while winding pair 143 may be windings 411e and 411f. With continuing reference to FIGS. 1 and 3, in another example, when rotor 301 is arranged horizontally, winding pair 141 may be left-side axial magnetic bearing 313 and winding pair 143 may be right-side axial magnetic bearing 323.

The windings pairs coupled to converter 110 may be also chosen such that the power requirements for each winding is equal. For example, with continuing reference to FIGS. 1 and 4, when a rotor is arranged horizontally such that windings 411c-411f must support the weight of the rotor, winding pair 141 may be windings 411c and 411d while winding pair 143 may be windings 411e and 411f.

Figure 6:
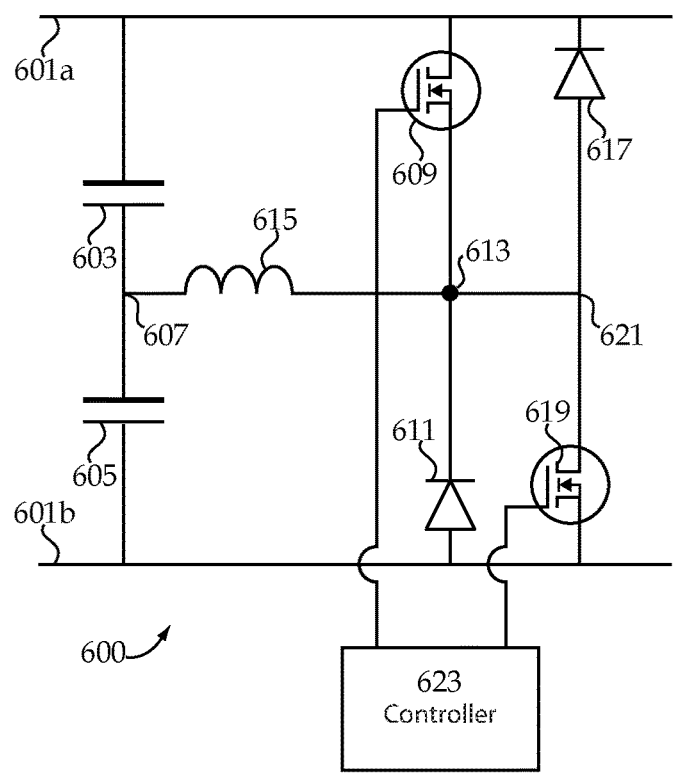
FIG. 6 illustrates an exemplary voltage balancing circuit for the AMB controllers of FIGS. 1 and 2.

With reference to FIG. 6 there is illustrated an exemplary AMB controller circuit 600 structured to maintain a neutral point voltage. Active voltage balancing may be necessary when the current transmitted to two unique pairs of windings, such as winding pairs 141 and 143 of FIG. 1, are not equal. Circuit 600 includes a DC bus positive rail 601a and a DC bus negative rail 601b, both rail 601a and 601b being electrically coupled to a DC power source (not pictured). Capacitor 603 is electrically coupled in series with capacitor 605 between positive rail 601a and negative rail 601b. Capacitors 603 and 605 are electrically coupled at a midpoint connection 607. Circuit 600 also includes a first leg electrically coupled between positive rail 601a and negative rail 601b having a semiconductor switching device 609 and a diode 611 with a leg node 613 located between the semiconductor switching device 609 and the diode 611 on the first leg. Circuit 600 also includes a second leg electrically coupled between positive rail 601a and negative rail 601b having a diode 617 and a semiconductor switching device 619 with a leg node 621 located between the diode 617 and the semiconductor switching device 619 on the second leg. The leg nodes 613 and 621 are connected to the capacitor midpoint connection 607 via an inductive component 615. Controller 600 includes a switch controller 623 structured to control switching devices 609 and 619 so as to balance the voltage across capacitors 603 and 605 such that midpoint connection 607 is a neutral point.

The implementation of active balancing function is based on transferring charge pulses between capacitors 603 and 605, by controlling switching devices 609 and 619. In a balanced situation both control signals, transmitted from controller 623 to switching devices 609 and 619 are in inactive low state. In an exemplary situation where the voltage of capacitor 603 tends to rise higher than the voltage of capacitor 605, controller 623 transmits an active high signal to switching device 609 causing it to close and connect the capacitor 603 voltage across inductor 615. Thus the inductor 615 current starts to rise and the capacitor 603 voltage starts to decrease. In the next step controller 623 transmits an inactive low signal to switching device 609, causing it to open. The inductive current of inductor 615 now turns to flow via diode 611 which means that the capacitor 605 connects across the inductor 615, starting to decrease its current. As long as the inductor 615 current flows in this situation it charges capacitor 605, thus increasing its voltage towards a balanced voltage state. In another voltage imbalance, i.e. capacitor 605 voltage tends to rise higher than capacitor 603 voltage, the measures for balancing correspond to the above with the difference that switching device 619 is controlled for transferring a charge pulse from capacitor 605 to capacitor 603. In certain embodiments, Circuit 600 is combined with system 100 of FIG. 1 such that capacitor 113 is capacitor 603 and capacitor 115 is capacitor 605.

It is contemplated that the various aspects, features, processes, and operations from the various embodiments may be used in any of the other embodiments unless expressly stated to the contrary. Certain operations illustrated may be implemented by a computer executing a computer program product on a non-transient computer readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described and that all changes and modifications that come within the spirit of the present disclosure are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A controller for an active magnetic bearing (AMB) having at least two windings, the controller comprising:
   a DC bus having a first and second rail;
   a pair of capacitors electrically coupled in series between the first and second rail, the capacitors having a midpoint connection;
   a magnetic driver circuit electrically coupled to the first and second rail of the DC bus and having a first output node and a second output node; and
   a switch controller in communication with the magnetic driver circuit,
   wherein at least one first winding of the AMB is electrically coupled in series between the midpoint connection and the first output node, and at least one second winding of the AMB is electrically coupled in series between the midpoint connection and the second output node,
   wherein the switch controller is structured to control the magnetic driver circuit so as to provide substantially cophasal power to the at least one first windings of the AMB and the at least one second windings of the AMB, and
   wherein the at least one first winding of the AMB is structured to generate a flux which opposes a flux generated by the at least one second winding of the AMB.

2. The controller of claim 1 additionally comprising a plurality of shunt resistors, each resistor being electrically coupled between either the first or second output nodes and the midpoint connection by way of at least one of the AMB windings, wherein the plurality of shunt resistors are structured to measure current and transmit current measurements to the switch controller.

3. The controller of claim 1, wherein the pair of capacitors are structured as being of substantially equal size such that the midpoint connection is a neutral point connection.

4. The controller of claim 1 wherein the voltage difference of the power provided to each AMB winding is between zero and one-half $V_{dc}$.

* * * * *